(12) United States Patent
Missoni et al.

(10) Patent No.: US 10,467,180 B2
(45) Date of Patent: *Nov. 5, 2019

(54) SLAVE DEVICE FOR A SERIAL SYNCHRONOUS FULL DUPLEX BUS SYSTEM

(71) Applicant: Infineon Technologies AG, Neubiberg (DE)

(72) Inventors: Albert Missoni, Graz (AT); Matthias Pichler, Wildon (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,805

(22) Filed: Mar. 13, 2018

(65) Prior Publication Data

US 2018/0203820 A1 Jul. 19, 2018

Related U.S. Application Data

(63) Continuation of application No. 14/848,472, filed on Sep. 9, 2015, now Pat. No. 9,916,278.

(30) Foreign Application Priority Data

Sep. 9, 2014 (DE) .......................... 10 2014 218 028

(51) Int. Cl.
| | |
|---|---|
| G06F 13/42 | (2006.01) |
| G06F 1/12 | (2006.01) |
| G06F 1/3296 | (2019.01) |
| G06F 13/364 | (2006.01) |
| H04L 5/14 | (2006.01) |
| G06F 1/10 | (2006.01) |

(52) U.S. Cl.
CPC ............ *G06F 13/4291* (2013.01); *G06F 1/10* (2013.01); *G06F 1/12* (2013.01); *G06F 1/3296* (2013.01); *G06F 13/364* (2013.01); *H04L 5/14* (2013.01); *H04L 5/1407* (2013.01)

(58) Field of Classification Search
None
See application file for complete search history.

(56) References Cited

U.S. PATENT DOCUMENTS

2012/0025870 A1* 2/2012 Ng .................. H03K 3/356121
326/63

OTHER PUBLICATIONS

Balakrishna, S. et al., "Design of Multi Threshold (Multi Vth) Level Converters for Block Interfaces", International Conference on VLSI, Communication & Instrumentation (ICVCI), 4 pgs, 2011.
Seong-Ook Jung, et al., "Low-Swing Clock Domino Logic Incorporating Dual Supply and Dual Threshold Voltaes", Design Automation Conference, Proceedings 39th, pp. 467-472, 2002.
Office Action issued for DE 102014218028.7, German Patent Office, dated Jun. 2, 2015.

* cited by examiner

*Primary Examiner* — Scott C Sun
(74) *Attorney, Agent, or Firm* — Schiff Hardin LLP (57) ABSTRACT

A slave device for a serial synchronous full duplex bus system, which has a data input stage, a clock input stage, an interface logic, a synchronization delay flip-flop, and a data output stage. The slave device is manufactured using nanometer technologies. Also, a method for operating the slave device.

14 Claims, 6 Drawing Sheets

SLAVE DEVICE FOR A SERIAL SYNCHRONOUS FULL DUPLEX BUS SYSTEM

FIELD OF THE DISCLOSURE

The disclosure relates to a slave device for a serial synchronous full duplex bus system. In particular the disclosure relates to a slave device manufactured using nanometer technologies.

SUMMARY

Serious synchronous full-duplex bus systems are used in a wide range of applications. A plurality of standards has been established for such bus systems. Well-known examples for such standards are the Serial Peripheral Interface (SPI) standard as well as the Trusted Platform Module interface (TPM interface) standard.

It's an object of the present disclosure to provide an improved slave device for a serial synchronous full duplex bus system as well as an improved method for operating such a slave device.

In a first aspect this object is achieved by a slave device for a serial synchronous full duplex bus system, wherein the slave device comprises a data input stage for receiving a medium voltage data bus signal from a master device of the bus system and for providing a medium voltage data signal, wherein the medium voltage data signal is supplied to a data signal level down shifter configured to produce a low voltage data signal corresponding to the medium voltage data signal;

a clock input stage for receiving a medium voltage clock bus signal from the master device of the bus system and for providing a medium voltage clock signal, wherein the medium voltage clock signal is supplied to a clock signal level down shifter configured to produce a low voltage clock signal corresponding to the medium voltage clock signal;

an interface logic configured to receive the low voltage data signal and the low voltage clock signal and to carry out one or more logical operations in order to produce one or more low voltage output data signals based on the low voltage data signal and based on the low voltage clock signal;

a synchronization delay flip-flop having a delay flip-flop data input, a delay flip-flop clock input and a delay flip-flop data output, wherein an asynchronous medium voltage output data signal, which is based on the one or more low voltage output data signals, is supplied to the delay flip-flop data input, wherein a medium voltage output clock signal derived from the medium voltage clock bus signal in a medium voltage portion of the slave device is supplied to the delay flip-flop clock input and wherein the delay flip-flop data output provides a synchronous medium voltage output data signal; and a data output stage configured to transmit a medium voltage data bus signal to the master device of the bus system, wherein the synchronous medium voltage output signal is supplied to the data output stage.

The term "medium voltage" herein refers to a voltage used to exchange data signals over bus wires of the bus system according to its specification. Typically such voltages are in the range between 1.65 V and 5.5 V. Furthermore, the term "low voltage" refers to voltages being lower than the selected medium voltage and being used within the interface logic. Such voltages may be in the range between 1 V and 2 V.

The parts of the slave device being operated using medium voltage form a medium voltage portion of the slave device, whereas the parts of the slave device being operated using low voltage form a low voltage portion of the slave device.

The data input stage may comprise a data input contact configured to be connected to a bus wire carrying a medium voltage data bus signal to be received by the slave device. Furthermore, the data input stage may comprise a data input converting stage, which may be a Schmitt trigger.

Analogously, the clock input stage may comprise a clock input contact configured to be connected to a bus wire carrying a medium voltage clock bus signal to be received by the slave device. Furthermore, the data input stage may comprise a clock input converting stage, which may as well be a Schmitt trigger.

The data output stage can include a data output contact configured to be connected to a bus wire receiving the medium voltage output data bus signal. Moreover, of the data output stage can have a data output converter stage, which also may be a Schmitt trigger.

Slave devices having a medium voltage portion and the low voltage portion require, then manufactured in nanometer technologies, as a minimum two different transistor types. The interface logic, also called core logic, the class fast but low voltage transistors. To cope with the comparatively high bus voltages (up to 5.5V compared to ~1.5V core voltage) additional high voltage transistors have to be used.

Transistors designed to withstand high voltages are typically used in non-volatile memories. The big drawback is that these transistors are very slow, because they have a very bad "analog" performance.

Fast slave devices, also called slave interfaces, such as slave devices according to the SPI or to the TPM interface standard, demand a fast response of output data to the bus clock signal. The timing arc through the chip (clerk input stage—clock signal level down shifter—interface logic—level up shifter—data output stage) limits the maximum transmission rate. Especially with decreasing core voltages in the low voltage portion in smaller technologies the level shifting is getting more and more a bottle neck because the high voltage transistor performance gets eroded dramatically at lower voltages.

Bad transistor performance on the one hand and decreasing core voltages on the other hand pose a big challenge, getting even worse with every new technology node. This disclosure provides a way to remove the level shifting from the limiting path and diminish the response delay through the chip.

With standard technology the interface speed is limited to a very low value. To achieve higher transmission rates special high voltage devices with a good performance at low voltages have been proposed, with the drawback of high additional wafer processing and offset costs (new technology, additional implants and masks).

With the slave device concept according to the disclosure a two signal path approach is introduced. One path serves as the typical connection of the interface module for data processing (RX and TX) while the second path establishes a very short and fast connection from clock input to data output.

The second path is arranged completely in the medium voltage portion of the slave device so that any delay of the clock information by lever shifters is avoided This second path consists of as few stages as possible to diminish the delay. For this reason the medium voltage output clock signal may be tapped right after or even before the input stage in the medium voltage portion of the slave device.

To synchronize the asynchronous medium voltage output data signal a synchronization delay flip-flop, which is also known as D flip-flop or as data flip-flop, is placed at the output side, which additionally may serve as a pre-converter structure. Hence, the total clock to output delay is composed of only the three delays of the clock input stage, the synchronization delay flip-flop and the data output stage. Besides the reduced number of stages also the voltage portion crossing (level shifting) is removed, which eliminates the core voltage dependency, i.e. this structure is well suited for technology shrinking.

To make use of this approach, some modifications may to be done to the slave device. As the asynchronous medium voltage output data signal is synchronized with the synchronization delay flip-flop in the medium voltage portion, it may be a desired that the asynchronous medium voltage output data signal is delivered earlier compared to prior art solutions. The detailed timing depends on the used standard, but the principle is the same. The available time for certain actions of the data transmission may be enhanced and the data processing may be divided to the paths.

Electro static discharge (ESD) robustness is not influenced by the disclosure as no other devices are used and existing concepts can be reused.

In contrast to a conventional design a speed-up by a factor of 3 is possible with this solution.

According to a preferred embodiment of the disclosure the medium voltage output clock signal is the medium voltage clock bus signal or the medium voltage clock signal. These features minimize the clock delay.

According to a preferred embodiment of the disclosure the asynchronous medium voltage output data signal is produced by an output data signal up shifter to which the low voltage output data signal or a signal derived from the low voltage output data signal in a low voltage portion of the slave device is supplied to. These features minimize the delay in the low voltage portion of the slave device.

According to a preferred embodiment of the disclosure, in a first mode of operation, the synchronization delay flip-flop is configured in such way that it is in a transparent mode at a beginning of a bus frame and in such way that it is switched to edge triggered mode at the arrival of a first edge of the medium voltage output clock signal for the bus frame. These features allow operating the safe device according to the SPI standard.

As for standard SPI no header for a bus frame is transmitted, there are no leading clock edges to prepare the data. Therefore, it is desired that the synchronization delay flip-flop has a special characteristic. Instead of a reset, it has a transparent input, what means that in this state the input data are directly forwarded to the output. At the change of the state to standard sequential mode the last data is saved. This can be easily achieved by influencing the first stage and the clock of the flip-flip, so that no negative impact on the speed limiting second stage occurs. A positive side effect of that behavior is that the slave device can be used as a general purpose input output (GPIO) in the transparent mode.

Every new SPI frame may start with the synchronization delay flip-flop in transparent mode to drive the first data. With the first edge of the medium voltage clock signal new data is provided from bus system to the slave device with simultaneously switching to sequential mode. As there is no dependency of the received data, no data stream decision is necessary for standard SPI. With the following edge data is synchronized and driven on the bus. A half clock cycle is gained for processing.

According to a preferred embodiment of the disclosure the interface logic comprises a register and, wherein the slave device comprises a selection module configured to produce a selection module output signal.

According to a preferred embodiment of the disclosure, in a second mode of operation, the interface logic is configured to receive a bit sequence within the low voltage data signal, which corresponds to a register address of the register, wherein the interface logic is configured to output, before a last bit of the bit sequence is received, a first low voltage output data signal corresponding to the register address containing the bit sequence without the last bit of the bit sequence and a last bit being set to zero and a second low voltage output data signal corresponding to the register address containing the bit sequence without the last bit of the bit sequence and a last bit being set to one, wherein the interface logic is configured to output, after receiving the last bit of the bit sequence, a low voltage address signal containing the last bit, wherein the selection module is configured to produce the selection module output signal depending on the first low voltage output data signal, the second low voltage output data signal, the medium voltage data signal, the low voltage address signal and the medium voltage clock signal.

According to the TPM Interface Specification a communication frame is always started with a command and an address as a header from the master device to the slave device. Dependent from this, the slave device has to react right after the last address bit and write to a register or read out and transmit the registers content.

For a read access the interface module provides the content of both possible registers before the reception of the last address bit. With respect to the typical flow, this is one clock cycle earlier. The final decision which data stream has to be used is done by a logic which has to be placed with special care to keep the signal paths to the pad as short as possible. At the edge of the address' lowest significant bit the selection module chooses the valid data stream and outputs it. With the next edge the synchronization delay flip-flop latches and drives the data. One full clock cycle is gained for processing.

According to a preferred embodiment of the disclosure the selection module comprises an output producer configured to produce the selection module output signal depending on the first low voltage output data signal and the second low voltage output data signal, and wherein the selection module comprises a selection control module configured to provide a selection control signal for the output producer, which depends on the low voltage address signal, the medium voltage data signal and the medium voltage clock signal.

By these features the signal paths may be kept short.

According to a preferred embodiment of the disclosure the selection control module comprises an address delay flip-flop comprising an address delay flip-flop data output, an address delay flip-flop clock input and an address delay flip-flop data input, the address delay flip-flop providing the selection control signal at an address delay flip-flop data output depending on the medium voltage data signal and a timing control signal being provided at an address delay flip-flop clock input by an AND gate depending on the low voltage address signal and the medium voltage clock signal.

By these features the signal paths may be kept short.

According to a preferred embodiment of the disclosure the first low voltage output data signal is supplied to a first data signal up shifter configured to produce a first medium voltage output data signal, wherein the first medium voltage output data signal is supplied to the output producer, wherein second low voltage output data signal is supplied to a second data signal up shifter configured to produce a second medium voltage output data signal, wherein the second medium voltage output data signal is supplied to the output producer, wherein the medium voltage data signal or the medium voltage data bus signal is supplied to the address delay flip-flop data input, wherein in the low voltage address signal is supplied to an address signal up shifter configured to produce a medium voltage address signal that in the medium voltage address signal is supplied to the AND gate, wherein the medium voltage clock signal or the medium voltage clock bus signal is supplied to the AND gate, wherein the selection module output signal is a medium voltage selection module output signal, and wherein the medium voltage selection module output signal is used as the asynchronous medium voltage output data signal.

By these features the selection control module is completely operated within the medium voltage portion of the slave device, which keeps the signal paths short and avoids additional leather shifting.

According to a preferred embodiment of the disclosure the first low voltage output data signal and the second low voltage output data signal are supplied to the output producer, wherein the low voltage data signal is supplied to the address delay flip-flop data input, wherein the low voltage address signal and the low voltage clock signal are supplied to the AND gate, wherein the selection module output signal is a low voltage selection module output signal, and wherein the low voltage selection module output signal is used as the low voltage output data signal.

By these features the selection control module is completely operated within the low voltage portion of the slave device, which keeps the signal paths short and avoids additional leather shifting.

According to a preferred embodiment of the disclosure the interface logic is configured, in a third mode of operation, to receive sequentially a plurality of bit sequences within the low voltage data signal, wherein each bit sequence corresponds to a register address of the register, wherein the interface logic is configured to output a first low voltage output data signal corresponding to a first register address and a second low voltage output data signal corresponding to a second register address in a time-shared way, wherein the interface logic is configured to output, a low voltage address signal, wherein the selection module is configured to produce an selection module output signal depending on the first low voltage output data signal, the second low voltage output data signal, the medium voltage data signal, the low voltage address signal and the medium voltage clock signal.

By these features of output data paths of the interface logic 6 may be used for increasing the lead time of the data. The selection module 21 switches between both paths so that the output data of both paths are forwarded. In this way an additional full clock cycle may be gained for processing.

The basic idea of the disclosure is to create a slave device topology permitting a performance beyond the limits of prior art technology by creating two different signal paths, a fast and a slow one. With an intelligent division of the two paths it is possible remove the limiting elements from the speed determining fast signal path and balance the timing to achieve an optimized performance.

To cover both SPI and TPM specification a special flip-flop is introduced, as well as a dedicated data processing and control flow.

The object of the disclosure is further achieved by a method for operating a slave device for a serial synchronous full duplex bus system, the method comprising the steps:

receiving a medium voltage data bus signal from a master device of the bus system and providing a medium voltage data signal using a data input stage, wherein the medium voltage data signal is supplied to a data signal level down shifter configured to produce a low voltage data signal corresponding to the medium voltage data signal;

receiving a medium voltage clock bus signal from the master device of the bus system and providing a medium voltage clock signal using a clock input stage, wherein the medium voltage clock signal is supplied to a clock signal level down shifter configured to produce a low voltage clock signal corresponding to the medium voltage clock signal;

receiving the low voltage data signal and the low voltage clock signal and carrying out one or more logical operations using an interface logic in order to produce one or more low voltage output data signals based on the low voltage data signal and based on the low voltage clock signal;

using a synchronization delay flip-flop having a delay flip-flop data input, a delay flip-flop clock input and a delay flip-flop data output, wherein an asynchronous medium voltage output data signal, which is based on the one or more low voltage output data signals, is supplied to the delay flip-flop data input, wherein a medium voltage output clock signal derived from the medium voltage clock bus signal in a medium voltage portion of the slave device is supplied to the delay flip-flop clock input and wherein the delay flip-flop data output provides a synchronous medium voltage output data signal; and transmitting a medium voltage data bus signal to the master device of the bus system using a data output stage, wherein the synchronous medium voltage output signal is supplied to the data output stage.

BRIEF DESCRIPTION OF THE DRAWINGS

Preferred embodiments of the disclosure are subsequently discussed with respect to the accompanying drawings, in which.

DETAILED DESCRIPTION

Figure 1:
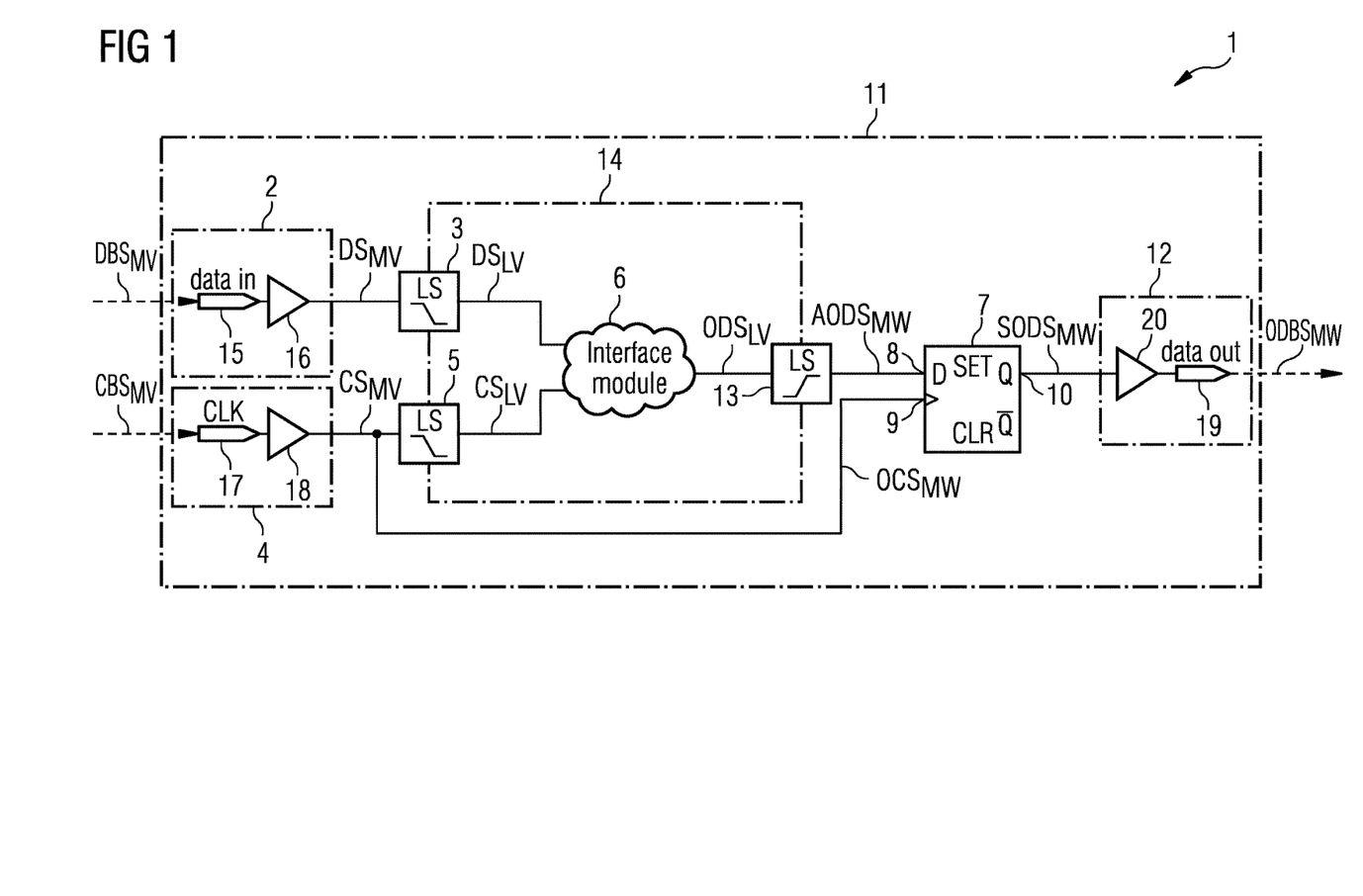
FIG. 1 illustrates a first embodiment of the slave device according to the disclosure.

FIG. 1 illustrates a first embodiment of the slave device according to the disclosure. The slave device comprises:

a data input stage 2 for receiving a medium voltage data bus signal $DBS_{MV}$ from a master device of the bus system and for providing a medium voltage data signal $DS_{MV}$, wherein the medium voltage data signal $DS_{MV}$ is supplied to a data signal level down shifter 3 configured to produce a low voltage data signal $DS_{LV}$ corresponding to the medium voltage data signal $DS_{MV}$;

a clock input stage 4 for receiving a medium voltage clock bus signal $CBS_{MV}$ from the master device of the bus system and for providing a medium voltage clock signal $CS_{MV}$, wherein the medium voltage clock signal $CS_{MV}$ is supplied to a clock signal level down shifter 5 configured to produce a low voltage clock signal $CS_{LV}$ corresponding to the medium voltage clock signal $CS_{MV}$;

an interface logic 6 configured to receive the low voltage data signal $DS_{LV}$ and the low voltage clock signal $CS_{LV}$ and to carry out one or more logical operations in order to produce one or more low voltage output data signals $ODS_{LV}$, $ODS_{LV0}$, $ODS_{LV1}$ based on the low voltage data signal $DS_{LV}$ and based on the low voltage clock signal $CS_{LV}$;

a synchronization delay flip-flop 7 having a delay flip-flop data input 8, a delay flip-flop clock input 9 and a delay flip-flop data output 10, wherein an asynchronous medium voltage output data signal $AODS_{MV}$, which is based on the one or more low voltage output data signals $ODS_{LV}$, $ODS_{LV0}$, $ODS_{LV1}$, is supplied to the delay flip-flop data input 8, wherein a medium voltage output clock signal $OCS_{MV}$ derived from the medium voltage clock bus signal $CBS_{MV}$ in a medium voltage portion 11 of the slave device 1 is supplied to the delay flip-flop clock input 9 and wherein the delay flip-flop data output 10 provides a synchronous medium voltage output data signal $SODS_{MV}$; and a data output stage 12 configured to transmit a medium voltage data bus signal $ODBS_{MV}$ to the master device of the bus system, wherein the synchronous medium voltage output signal $SODS_{MV}$ is supplied to the data output stage 12.

The term "medium voltage" herein refers to a voltage used to exchange data signals over bus wires of the bus system according to its specification. Typically such voltages are in the range between 1.65 V and 5.5 V. Furthermore, the term "low voltage" refers to voltages being lower than the selected medium voltage and being used within the interface logic. Such voltages may be in the range between 1 V and 2 V.

The parts of the slave device 1 being operated using medium voltage form a medium voltage portion 11 of the slave device 1, whereas the parts of the slave device 1 being operated using low voltage form a low voltage portion 14 of the slave device 1.

The data input stage 2 may comprise a data input contact 15 configured to be connected to a bus wire carrying a medium voltage data bus signal $DBS_{MV}$ to be received by the slave device 1. Furthermore, the data input stage 2 may comprise a data input converting stage 16, which may be a Schmitt trigger 16.

Analogously, the clock input stage 4 may comprise a clock input contact 17 configured to be connected to a bus wire carrying a medium voltage clock bus signal $CBS_{MV}$ to be received by the slave device 1. Furthermore, the data input stage 4 may comprise a clock input converting stage 18, which may as well be a Schmitt trigger 18.

The data output stage 12 can include a data output contact 19 configured to be connected to a bus wire receiving the medium voltage output data bus signal $ODBS_{MV}$. Moreover, of the data output stage 12 can have a data output converter 20 stage, which also may be a Schmitt trigger 20.

Slave devices 1 having a medium voltage portion 11 and the low voltage portion 14 require, then manufactured in nanometer technologies, as a minimum two different transistor types. The interface logic, also called core logic, the class fast but low voltage transistors. To cope with the comparatively high bus voltages (up to 5.5V compared to ~1.5V core voltage) additional high voltage transistors have to be used.

Transistors designed to withstand high voltages are typically used in non-volatile memories. The big drawback is that these transistors are very slow, because they have a very bad "analog" performance.

Fast slave devices 1, also called slave interfaces, such as slave devices 1 according to the SPI or to the TPM interface standard, demand a fast response of output data to the bus clock signal. The timing arc at prior art slave devices through the chip (clock input stage 4—clock signal level down shifter 5—interface logic 6—level up shifter 13—data output stage 12) limits the maximum transmission rate. Especially with decreasing core voltages in the low voltage portion 14 in smaller technologies the level shifting is getting more and more a bottle neck because the high voltage transistor performance gets eroded dramatically at lower voltages.

Bad transistor performance on the one hand and decreasing core voltages on the other hand pose a big challenge, getting even worse with every new technology node. This disclosure provides a way to remove the level shifting from the limiting path and diminish the response delay through chip.

With standard technology the interface speed is limited to a very low value. To achieve higher transmission rates special devices special high voltage devices with a good performance at low voltages have been proposed, with the drawback of high additional wafer processing and offset costs (new technology, additional implants and masks).

With the slave device 1 concept according to the disclosure a two signal path approach is introduced. One path serves as the typical connection of the interface module for data processing (RX and TX) while the second path establishes a very short and fast connection from clock input to data output.

The second path is arranged completely in the medium voltage portion of the slave device so that any delay of the clock information by lever shifters is avoided This second path consists of as few stages as possible to diminish the delay. For this reason the medium voltage output clock signal $OCS_{MV}$ may be tapped right after or even before the clock input stage 4 in the medium voltage portion 11 of the slave device 1.

To synchronize the asynchronous medium voltage output data signal $AODS_{MV}$ a synchronization delay flip-flop 7, which is also known as D flip-flop 7 or as data flip-flop 7, is placed at the output side, which additionally may serve as a pre-converter structure. Hence, the total clock to output delay is composed of only the three delays of the clock input stage 4, the synchronization delay flip-flop 7 and the data output stage 12. Besides the reduced number of stages also the voltage portion crossing (level shifting) is removed, which eliminates the core voltage dependency, i.e. this structure is well suited for technology shrinking.

To make use of this approach, some modifications may to be done to the slave device 1. As the asynchronous medium voltage output data signal $AODS_{MV}$ is synchronized with the synchronization delay flip-flop 7 in the medium voltage portion 11, it may be a desired that the asynchronous medium voltage output data signal $AODS_{MV}$ is delivered earlier compared to prior art solutions. The detailed timing depends on the used standard, but the principle is the same. The available time for certain actions of the data transmission may be enhanced and the data processing may be divided to the paths.

Electro static discharge (ESD) robustness is not influenced by the disclosure as no other devices are used and existing concepts can be reused.

In contrast to a conventional design a speed-up by a factor of 3 is possible with this solution.

According to a preferred embodiment of the disclosure the medium voltage output clock signal $OCS_{MV}$ is the medium voltage clock bus signal $CBS_{MV}$ or the medium voltage clock signal $CS_{MV}$. These features minimize the clock delay.

According to a preferred embodiment of the disclosure the asynchronous medium voltage output data signal $AODS_{MV}$ is produced by an output data signal up shifter 13 to which the low voltage output data signal $ODS_{LV}$, $ODS_{LV0}$, $ODS_{LV1}$ or a signal $SMOS_{LV}$ derived from the low voltage output data signal $ODS_{LV}$, $ODS_{LV0}$, $ODS_{LV1}$ in a low voltage portion 14 of the slave device 1 is supplied to. These features minimize the delay in the low voltage portion of the slave device 1.

According to a preferred embodiment of the disclosure, in a first mode of operation, the synchronization delay flip-flop 7 is configured in such way that it is in a transparent mode at a beginning of a bus frame and in such way that it is switched to edge triggered mode at the arrival of a first edge of the medium voltage output clock signal $OCS_{MV}$ for the bus frame. These features allow operating the safe device according to the SPI standard.

As for standard SPI no header for a bus frame is transmitted, there are no leading clock edges to prepare the data. See also FIG. 4. Therefore, it is desired that the synchronization delay flip-flop 7 has a special characteristic. Instead of a reset, it has a transparent input 8, what means that in this state the input data are directly forwarded to the output 10. At the change of the state to standard sequential mode the last data is saved. This can be easily achieved by influencing the first stage and the clock of the flip-flop 7, so that no negative impact on the speed limiting second stage occurs. A positive side effect of that behavior is that the slave device 1 can be used as a general purpose input output (GPIO) in the transparent mode.

Every new SPI frame may start with the synchronization delay flip-flop 7 in transparent mode to drive the first data. With the first edge of the medium voltage clock signal $CS_{MV}$ new data is provided from bus system to the slave device 1 with simultaneously switching to sequential mode. As there is no dependency of the received data, no data stream decision is necessary for standard SPI. With the following edge data is synchronized and driven on the bus. A half clock cycle is gained for processing. See also FIG. 5.

Figure 2:
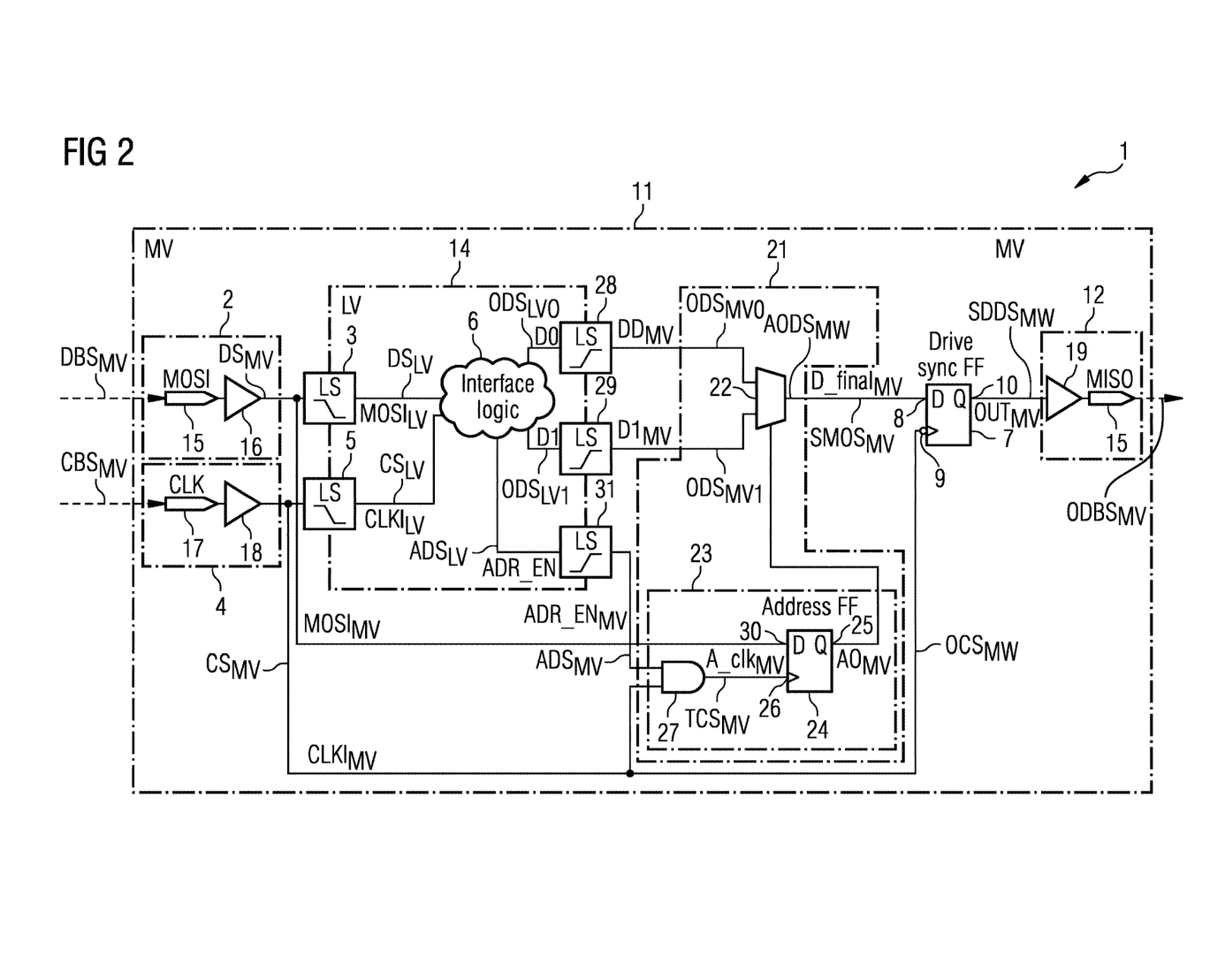
FIG. 2 illustrates a second embodiment of the slave device according to the disclosure.

FIG. 2 illustrates a second embodiment of the slave device according to the disclosure.

According to a preferred embodiment of the disclosure the interface logic 6 comprises a register and wherein the slave device 1 comprises a selection module 21 configured to produce a selection module output signal $SMOS_{LV}$, $SMOS_{MV}$.

According to a preferred embodiment of the disclosure, in a second mode of operation, the interface logic 6 is configured to receive a bit sequence DTS within the low voltage data signal $DS_{LV}$, which corresponds to a register address of the register, wherein the interface logic 6 is configured to output, before a last bit of the bit sequence DTS is received, a first low voltage output data signal $ODS_{LV0}$ corresponding to the register address containing the bit sequence DTS without the last bit of the bit sequence DTS and a last bit being set to zero and a second low voltage output data signal $ODS_{LV1}$ corresponding to the register address containing the bit sequence DTS without the last bit of the bit sequence DTS and a last bit being set to one, wherein the interface logic 6 is configured to output, after receiving the last bit of the bit sequence DTS, a low voltage address signal $ADS_{LV}$ containing the last bit, wherein the selection module 21 is configured to produce the selection module output signal $SMOS_{LV}$, $SMOS_{MV}$ depending on the first low voltage output data signal $ODS_{LV0}$, the second low voltage output data signal $ODS_{LV}$i, the medium voltage data signal $DS_{MV}$, the low voltage address signal $ADS_{LV}$ and the medium voltage clock signal $CS_{MV}$.

According to the TPM Interface Specification a communication frame is always started with a command and an address as a header from the master device to the slave device 1. See also FIG. 7. Dependent from this, the slave device 1 has to react right after the last address bit and write to a register or read out and transmit the registers content. See also FIG. 8 and FIG. 9.

For a read access the interface module 6 provides the content of both possible registers before the reception of the last address bit. With respect to the typical flow, this is one clock cycle earlier. The final decision which data stream has to be used is done by a logic 21 which has to be placed with special care to keep the signal paths to the pad as short as possible. At the edge of the address' lowest significant bit the selection module 21 the valid data stream and outputs it. With the next edge the synchronization delay flip-flop latches and drives the data. One full clock cycle is gained for processing.

According to a preferred embodiment of the disclosure the selection module 21 comprises an output producer 22 configured to produce the selection module output signal $SMOS_{LV}$, $SMOS_{MV}$ depending on the first low voltage output data signal $ODS_{LV0}$ and the second low voltage output data signal $ODS_{LV1}$, and wherein the selection module 21 comprises a selection control timing module 23 configured to provide a selection control signal $SCS_{MV}$, $SCS_{LV}$ for the output producer 22, which depends on the low voltage address signal $ADS_{LV}$, the medium voltage data signal $DS_{MV}$ and the medium voltage clock signal $CS_{MV}$.

By these features the signal paths may be kept short.

According to a preferred embodiment of the disclosure the selection control module 21 comprises an address delay flip-flop 24 comprising an address delay flip-flop data output 25, an address delay flip-flop clock input 25 and an address delay flip-flop data input 30, the address delay flip-flop 24 providing the selection control signal $SCS_{MV}$, $SCS_{LV}$ at the address delay flip-flop data output 25 depending on the medium voltage data signal $DS_{MV}$ and a timing control signal $TCS_{MV}$, $TCS_{LV}$ being provided at an address delay flip-flop clock input 26 by an AND gate 27 depending on the low voltage address signal $ADS_{LV}$ and the medium voltage clock signal $CS_{MV}$.

By these features the signal paths may be kept short.

According to a preferred embodiment of the disclosure the first low voltage output data signal $ODS_{LV0}$ is supplied to a first data signal up shifter 28 configured to produce a first medium voltage output data signal $ODS_{MV0}$, wherein the first medium voltage output data signal $ODS_{MV0}$ is supplied to the output producer 22, wherein second low voltage output data signal $ODS_{LV1}$ is supplied to a second data signal up shifter 29 configured to produce a second medium voltage output data signal $ODS_{MV1}$, wherein the second medium voltage output data signal $ODS_{MV1}$ is supplied to the output producer 22, wherein the medium voltage data signal $DS_{MV}$ or the medium voltage data bus signal $DBS_{MV}$ is supplied to the address delay flip-flop data input 30, wherein in the low voltage address signal $ADS_{LV}$ is supplied to an address signal up shifter 31 configured to produce a medium voltage address signal $ADS_{MV}$, wherein the medium voltage address signal $ADS_{MV}$ is supplied to the AND gate 27, wherein the medium voltage clock signal $CS_{MV}$ or the medium voltage clock bus signal $CBS_{MV}$ is supplied to the AND gate 27, wherein the selection module output signal $SMOS_{MV}$, $SMOS_{LV}$ is a medium voltage selection module output signal $SMOS_{MV}$, and wherein the medium voltage selection module output signal $SMOS_{MV}$ is used as the asynchronous medium voltage output data signal $AODS_{MV}$.

By these features the selection control module 21 is completely operated within the medium voltage portion 11 of the slave device 1, which keeps the signal paths short and avoids additional leather shifting.

The second embodiment according to FIG. 2 is mainly intended for use in a TPM interface domain. However, it is also suitable for the use in an SPI domain. In that the latter case it is possible to use only one of the low voltage output data signals $ODS_{LV0}$ and $ODS_{LV1}$.

The disclosure also provides a method for operating a slave device 1 for a serial synchronous full duplex bus system The method comprising the steps:

receiving a medium voltage data bus signal $DBS_{MV}$ from a master device of the bus system and providing a medium voltage data signal $DS_{MV}$ using a data input stage 2, wherein the medium voltage data signal $DS_{MV}$ is supplied to a data signal level down shifter 3 configured to produce a low voltage data signal $DS_{LV}$ corresponding to the medium voltage data signal $DS_{MV}$;

receiving a medium voltage clock bus signal $CBS_{MV}$ from the master device of the bus system and providing a medium voltage clock signal $CS_{MV}$ using a clock input stage 4, wherein the medium voltage clock signal $CS_{MV}$ is supplied to a clock signal level down shifter 5 configured to produce a low voltage clock signal $CS_{LV}$ corresponding to the medium voltage clock signal $CS_{MV}$;

receiving the low voltage data signal $DS_{LV}$ and the low voltage clock signal $CS_{LV}$ and carrying out one or more logical operations using an interface logic 6 in order to produce one or more low voltage output data signals $ODS_{LV}$, $ODS_{LV0}$, $ODS_{LV1}$ based on the low voltage data signal $DS_{LV}$ and based on the low voltage clock signal $CS_{LV}$;

using a synchronization delay flip-flop 7 having a delay flip-flop data input 8, a delay flip-flop clock input 9 and a delay flip-flop data output 10, wherein an asynchronous medium voltage output data signal $AODS_{MV}$, which is based on the one or more low voltage output data signals $ODS_{LV}$, $ODS_{LV0}$, $ODS_{LV1}$, is supplied to the delay flip-flop data input 8, wherein a medium voltage output clock signal $OCS_{MV}$ derived from the medium voltage clock bus signal $CBS_{MV}$ in a medium voltage portion 11 of the slave device 1 is supplied to the delay flip-flop clock input 9 and wherein the delay flip-flop data output 10 provides a synchronous medium voltage output data signal $SODS_{MV}$; and transmitting a medium voltage data bus signal $ODBS_{MV}$ to the master device of the bus system using a data output stage 12, wherein the synchronous medium voltage output signal is supplied to the data output stage $SODS_{MV}$.

Figure 3:
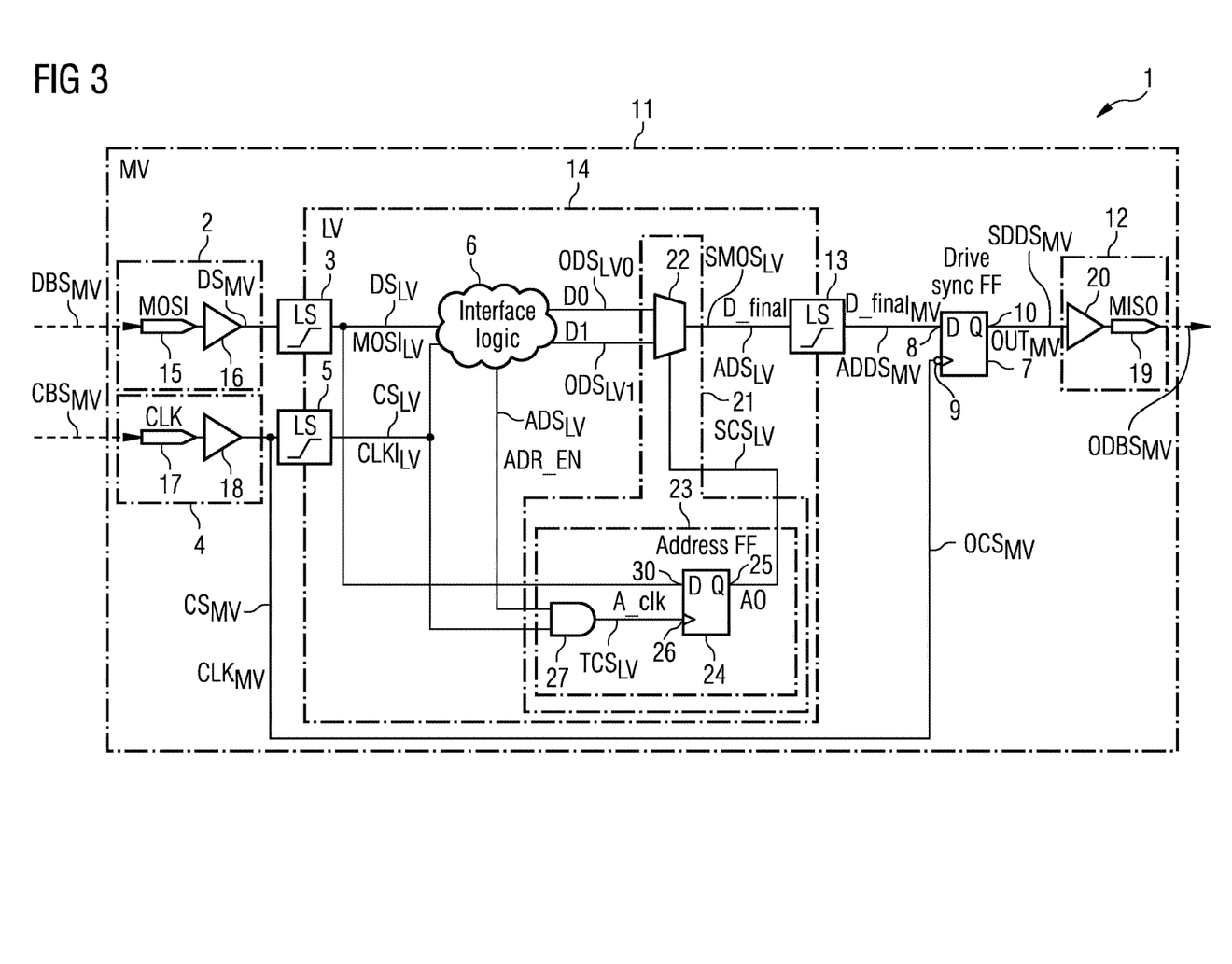
FIG. 3 illustrates a third embodiment of the slave device according to the disclosure.

FIG. 3 illustrates a third embodiment of the slave device according to the disclosure.

According to a preferred embodiment of the disclosure the first low voltage output data signal $ODS_{LV0}$ and the second low voltage output data signal $ODS_{LV1}$ are supplied to the output producer 22, wherein the low voltage data signal $DS_{LV}$ is supplied to the address delay flip-flop data input 30, wherein the low voltage address signal $ADS_{LV}$ and the low voltage clock signal $CS_{LV}$ are supplied to the AND gate 27, wherein the selection module output signal $SMOS_{MV}$, $SMOS_{LV}$ is a low voltage selection module output signal $SMOS_{LV}$, and wherein the low voltage selection module output signal $SMOS_{LV}$ is used as the low voltage output data signal $ODS_{LV}$.

By these features the selection control module 21 is completely operated within the low voltage portion 14 of the slave device 1, which keeps the signal paths short and avoids additional leather shifting.

Figure 4:
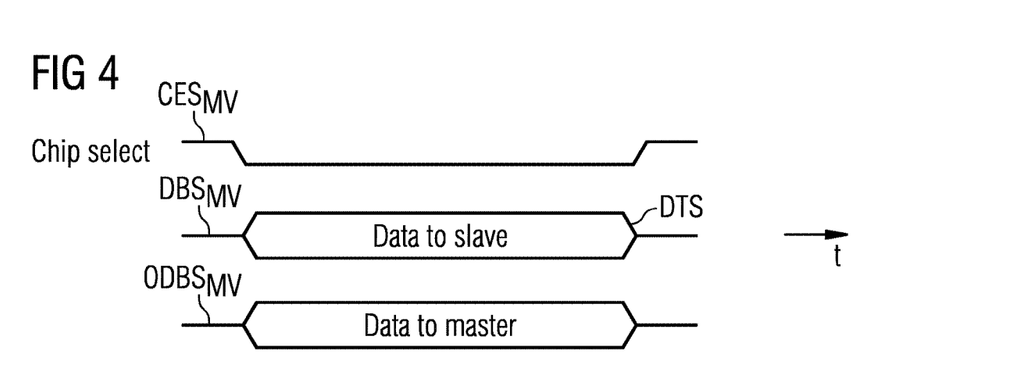
FIG. 4 illustrates a structure of the bus frame according to the SPI standard.

FIG. 4 illustrates a structure of the bus frame according to the SPI standard. Shown is the medium voltage data bus signal $DBS_{MV}$ carrying a bit sequence DTS and the medium voltage output data bus signal $ODBS_{MV}$ over time. Furthermore, a chip select signal $CES_{MV}$ is shown over time which is used in SPI in order to indicate by which slave device the medium voltage data bus signal $DBS_{MV}$ be processed in case there is a plurality of slave devices connected to the bus system.

Figure 5:
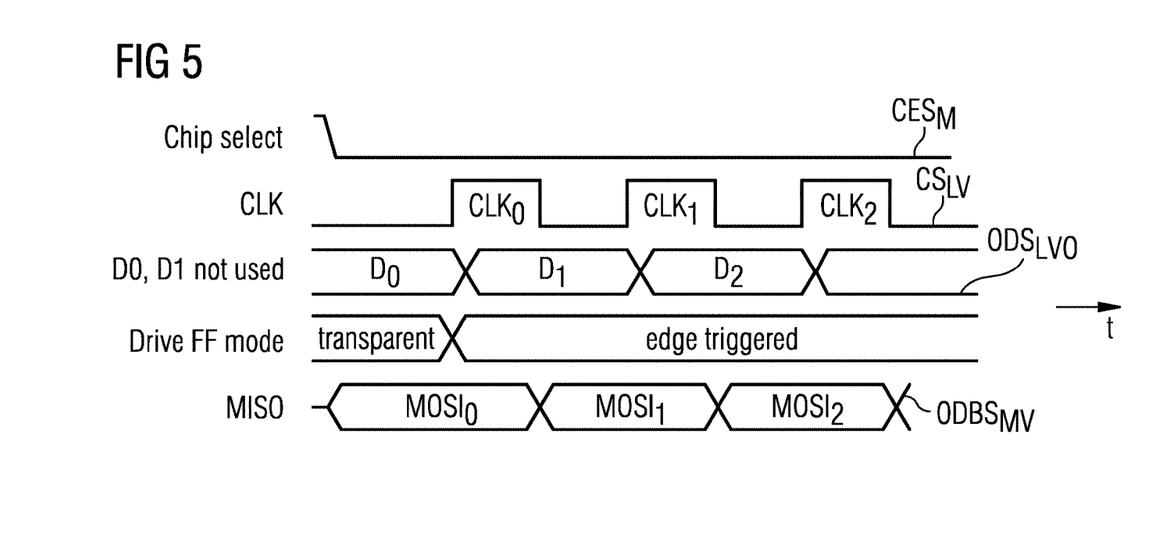
FIG. 5 illustrates a structure of the beginning of the transmission of the bus frame within the first mode of operation.

FIG. 5 illustrates a structure of the beginning of the transmission of the bus frame within the first mode of operation. Additionally shown are the low voltage clock signal $CS_{LW}$, the first low voltage output data signal $ODS_{LW0}$ and the mode of the synchronization delay flip-flop 7.

Figure 6:
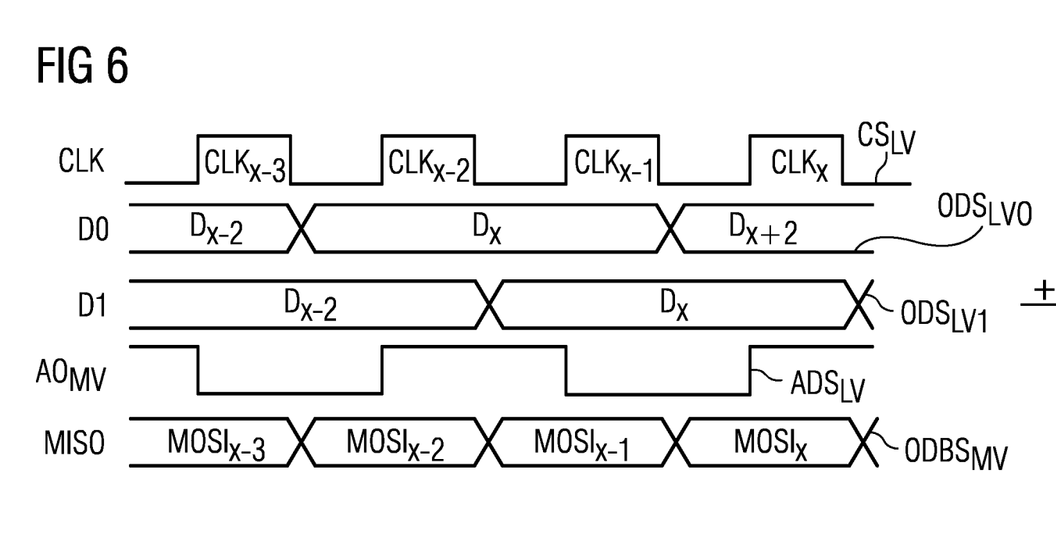
FIG. 6 illustrates a structure of the data processing within the third mode of operation.

FIG. 6 illustrates a structure of the data processing within the third mode of operation.

According to a preferred embodiment of the disclosure the interface logic 6 is configured, in a third mode of operation, to receive sequentially a plurality of bit sequences DTS within the low voltage data signal $DS_{LV}$, wherein each bit sequence DTS corresponds to a register address of the register, wherein the interface logic 6 is configured to output a first low voltage output data signal $ODS_{LV0}$ corresponding to a first register address and a second low voltage output data signal $ODS_{LV1}$ corresponding in a time-shared way, wherein the interface logic 6 is configured to output a low voltage address signal $ADS_{LV}$, wherein the selection module 21 is configured to produce an selection module output signal $SMOS_{MV}$, $SMOS_{LV}$ depending on the first low voltage output data signal $ODS_{LV0}$, the second low voltage output data signal $ODS_{LV1}$, the medium voltage data signal $DS_{MV}$, the low voltage address signal $ADS_{LV}$ and the medium voltage clock signal $CS_{MV}$.

By these features of output data paths of the interface logic 6 may be used for increasing the lead time of the data. The selection module 21 switches between both paths so that the output data of both paths are forwarded. In this way an additional full clock cycle may be gained for processing.

Figure 7:
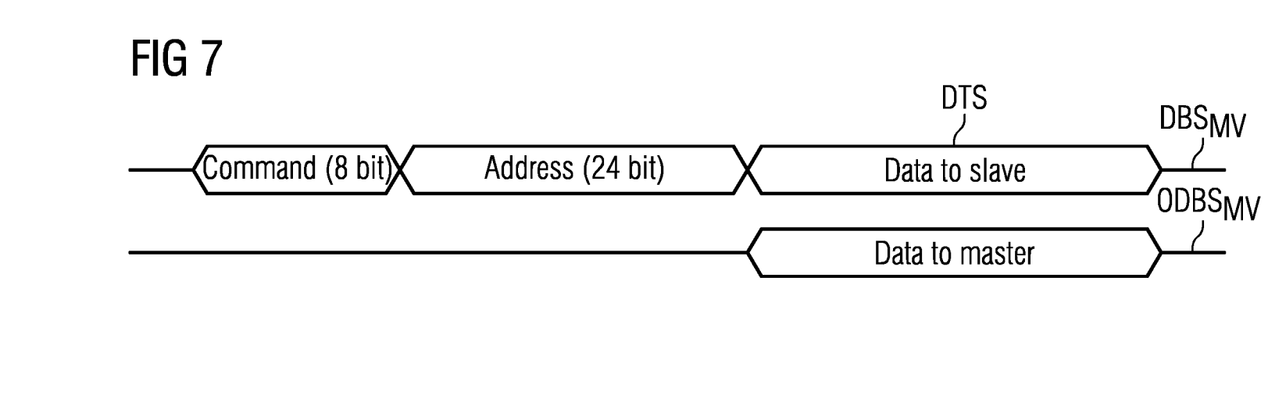
FIG. 7 illustrates a structure of the bus frame according to the TPM interface standard.

FIG. 7 illustrates a structure of the bus frame according to the TPM interface standard. Shown are the medium voltage data bus signal $DBS_{MV}$ carrying a bit sequence DTS and the medium voltage output data bus signal $ODBS_{MV}$ each over time.

Figure 8:
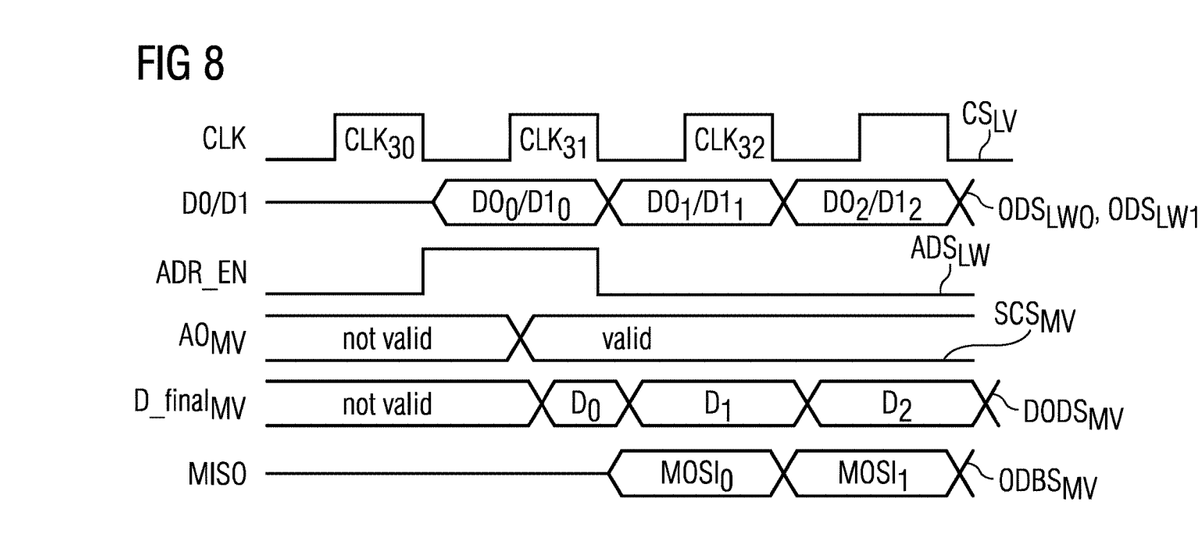
FIG. 8 illustrates a structure of the beginning of the transmission of the bus frame within the second mode of operation.

FIG. 8 illustrates a structure of the beginning of the transmission of the bus frame within the second mode of operation. Shown are the low voltage clock signal $CS_{LW}$, the first and second low voltage output data signal $ODS_{LW0}$ and $ODS_{LW1}$, the low voltage address signal $ADS_{LW}$, the validity of the medium voltage selection control signal $SCS_{MV}$, asynchronous medium voltage output data signal $AODS_{MV}$ and the medium voltage output data bus signal ODBS$_{MV}$ of the embodiment of FIG. 2 each over time.

The illustration of FIG. 8 is by the way of analogy also valid for the embodiment of FIG. 3.

Figure 9:
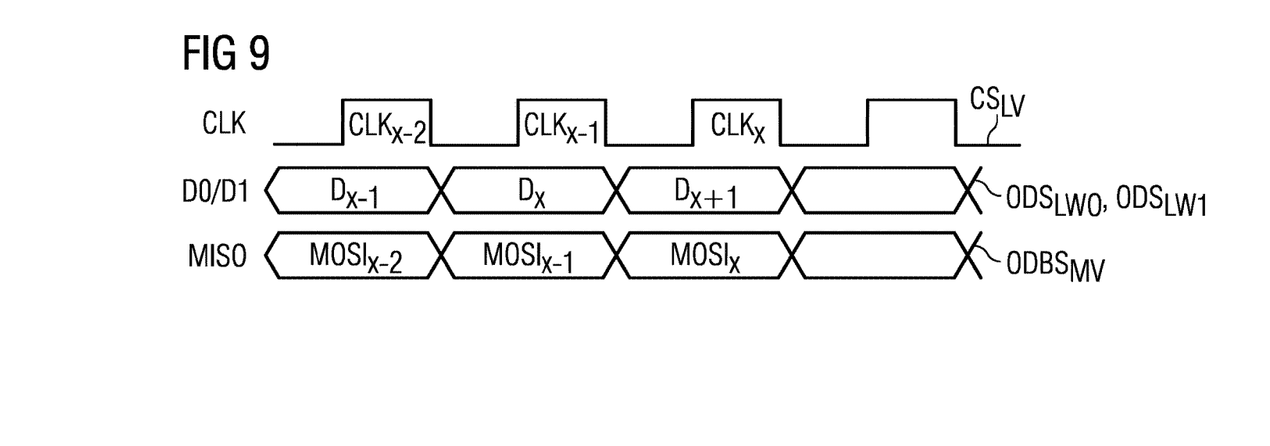
FIG. 9 illustrates a structure of the data flow within the 2nd mode of operation.

FIG. 9 illustrates a structure of the data flow within the second mode of operation. Shown are the low voltage clock signal CS$_{LV}$, the first and second low voltage output data signal ODS$_{LV0}$ and ODS$_{LV1}$ and the medium voltage output data bus signal ODBS$_{MV}$ of the embodiment of FIG. 2 each over time.

The illustration of FIG. 9 is by the way of analogy also valid for the embodiment of FIG. 3.

With respect to the slave device 1 and the methods of the described embodiments the following is mentioned:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

REFERENCE SIGNS 1 slave device
2 data input stage
3 data signal level down shifter
4 clock input stage
5 clock signal level down shifter
6 interface logic
7 synchronization delay flip-flop
8 synchronization delay flip-flop data input
9 synchronization delay flip-flop clock input
10 synchronization delay flip-flop data output
11 medium voltage portion
12 data output stage
13 output data signal up shifter
14 low voltage portion
15 data input contact
16 data input converter stage
17 clock input contact
18 clock input converter stage
19 data output contact
20 data output converter stage
21 selection module
22 output producer
23 selection control timing module
24 address delay flip-flop
25 address delay flip-flop data output
26 address delay flip-flop clock input
27 AND gate
28 first data signal up shifter
29 second data signal up shifter
30 address delay flip-flop data input
31 address signal up shifter
DBS$_{MV}$ medium voltage data bus signal
DS$_{MV}$ medium voltage data signal
DS$_{LV}$ low voltage data signal
CBS$_{MV}$ medium voltage clock bus signal
CS$_{MV}$ medium voltage clock signal
CS$_{LV}$ low voltage clock signal
ODS$_{LV}$ low voltage output data signal
AODS$_{MV}$ asynchronous medium voltage output data signal
OCS$_{MV}$ medium voltage output clock signal
SODS$_{MV}$ synchronous medium voltage output data signal
ODBS$_{MV}$ medium voltage output data bus signal
ODS$_{LV0}$ first low voltage output data signal
ODS$_{LV1}$ second low voltage output data signal
ADS$_{LV}$ low voltage address signal
SMOS$_{MV}$ medium voltage selection module output signal
SCS$_{MV}$ medium voltage selection control signal
TCS$_{MV}$ medium voltage timing control signal
ODS$_{MV0}$ first medium voltage output data signal
ODS$_{MV1}$ second medium voltage output data signal
ADS$_{MV}$ medium voltage address signal
SMOS$_{LV}$ low voltage selection module output signal
TCS$_{LV}$ low voltage timing control signal
DTS bit sequence
CES$_{MV}$ chip select signal

The invention claimed is:

1. A slave device for a serial synchronous full duplex bus system, the slave device comprising:
a data input stage configured to receive a medium voltage data bus signal from a master device of the bus system and configured to provide a medium voltage data signal, wherein the medium voltage data signal is supplied to a data signal level down shifter configured to produce a low voltage data signal corresponding to the medium voltage data signal;
a clock input stage configured to receive a medium voltage clock bus signal from the master device of the bus system and configured to provide a medium voltage clock signal, wherein the medium voltage clock signal is supplied to a clock signal level down shifter configured to produce a low voltage clock signal corresponding to the medium voltage clock signal;
an interface logic configured to receive the low voltage data signal and the low voltage clock signal and to carry out one or more logical operations in order to produce one or more low voltage output data signals based on the low voltage data signal and based on the low voltage clock signal;
a synchronization delay flip-flop having a delay flip-flop data input, a delay flip-flop clock input, and a delay flip-flop data output,
wherein an asynchronous medium voltage output data signal, which is based on the one or more low voltage output data signals, is supplied to the delay flip-flop data input, the asynchronous medium voltage output data signal being different than the medium voltage data signal,
wherein a medium voltage output clock signal derived from the medium voltage clock bus signal in a medium voltage portion of the slave device is supplied to the delay flip-flop clock input, and
wherein the delay flip-flop data output provides a synchronous medium voltage output data signal; and
a data output stage configured to transmit a medium voltage data bus signal to the master device of the bus system,
wherein the synchronous medium voltage output signal is supplied to the data output stage.

2. The slave device according to claim 1, wherein the medium voltage output clock signal is the medium voltage clock bus signal or the medium voltage clock signal.

3. The slave device according to claim 1, wherein the asynchronous medium voltage output data signal is produced by an output data signal up shifter to which the low voltage output data signal or a signal derived from the low voltage output data signal in a low voltage portion of the slave device is supplied to.

4. The slave device according to claim 1, wherein, in a first mode of operation, the synchronization delay flip-flop is configured in such way that it is in a transparent mode at a beginning of a bus frame and in such way that it is switched to edge triggered mode at the arrival of a first edge of the medium voltage output clock signal for the bus frame.

5. The slave device according to claim 1, wherein the interface logic comprises a register and wherein the slave device comprises a selection module configured to produce a selection module output signal.

6. The slave device according to claim 1, wherein, in a second mode of operation, the interface logic is configured to receive a bit sequence within the low voltage data signal, which corresponds to a register address of the register, wherein the interface logic is configured to output, before a last bit of the bit sequence is received, a first low voltage output data signal corresponding to the register address containing the bit sequence without the last bit of the bit sequence and a last bit being set to zero and a second low voltage output data signal corresponding to the register address containing the bit sequence without the last bit of the bit sequence and a last bit being set to one, wherein the interface logic is configured to output, after receiving the last bit of the bit sequence, a low voltage address signal containing the last bit, wherein the selection module is configured to produce the selection module output signal depending on the first low voltage output data signal, the second low voltage output data signal, the medium voltage data signal, the low voltage address signal and the medium voltage clock signal.

7. The slave device according to claim 6, wherein the selection module comprises an output producer configured to produce the selection module output signal depending on the first low voltage output data signal and the second low voltage output data signal, and wherein the selection module comprises a selection control timing module configured to provide a selection control signal for the output producer, which depends on the low voltage address signal, the medium voltage data signal and the medium voltage clock signal.

8. The slave device according to claim 7, wherein the selection control module comprises an address delay flip-flop comprising an address delay flip-flop data output, an address delay flip-flop clock input and an address delay flip-flop data input, the address delay flip-flop providing the selection control signal at the address delay flip-flop data output depending on the medium voltage data signal and a timing control signal being provided at an address delay flip-flop clock input by an AND gate depending on the low voltage address signal and the medium voltage clock signal.

9. The slave device according to claim 8, wherein first low voltage output data signal is supplied to a first data signal up shifter configured to produce a first medium voltage output data signal, wherein the first medium voltage output data signal is supplied to the output producer, wherein second low voltage output data signal is supplied to a second data signal up shifter configured to produce a second medium voltage output data signal, wherein the second medium voltage output data signal is supplied to the output producer, wherein the medium voltage data signal or the medium voltage data bus signal is supplied to the address delay flip-flop data input, wherein in the low voltage address signal is supplied to an address signal up shifter configured to produce a medium voltage address signal, wherein the medium voltage address signal is supplied to the AND gate, wherein the medium voltage clock signal or the medium voltage clock bus signal is supplied to the AND gate, wherein the selection module output signal is a medium voltage selection module output signal, and wherein the medium voltage selection module output signal is used as the asynchronous medium voltage output data signal.

10. The slave device according to claim 9, wherein the first low voltage output data signal and the second low voltage output data signal are supplied to the output producer, wherein the low voltage data signal is supplied to the address delay flip-flop data input, wherein the low voltage address signal and the low voltage clock signal are supplied to the AND gate, wherein the selection module output signal is a low voltage selection module output signal, and wherein the low voltage selection module output signal is used as the low voltage output data signal.

11. The slave device according to claim 6, wherein the interface logic is configured, in a third mode of operation, to receive sequentially a plurality of bit sequences within the low voltage data signal, wherein each bit sequence corresponds to a register address of the register, wherein the interface logic is configured to output a first low voltage output data signal corresponding to a first register address and a second low voltage output data signal corresponding in a time-shared way, wherein the interface logic is configured to output a low voltage address signal, wherein the selection module is configured to produce an selection module output signal depending on the first low voltage output data signal, the second low voltage output data signal, the medium voltage data signal, the low voltage address signal and the medium voltage clock signal.

12. A method for operating a slave device for a serial synchronous full duplex bus system, the method comprising:
receiving a medium voltage data bus signal from a master device of the bus system and providing a medium voltage data signal using a data input stage, wherein the medium voltage data signal is supplied to a data signal level down shifter configured to produce a low voltage data signal corresponding to the medium voltage data signal;
receiving a medium voltage clock bus signal from the master device of the bus system and providing a medium voltage clock signal using a clock input stage, wherein the medium voltage clock signal is supplied to a clock signal level down shifter configured to produce a low voltage clock signal corresponding to the medium voltage clock signal;
receiving the low voltage data signal and the low voltage clock signal and carrying out one or more logical operations using an interface logic in order to produce one or more low voltage output data signals based on the low voltage data signal and based on the low voltage clock signal;
using a synchronization delay flip-flop having a delay flip-flop data input, a delay flip-flop clock input and a delay flip-flop data output,
wherein an asynchronous medium voltage output data signal, which is based on the one or more low voltage output data signals, is supplied to the delay flip-flop data input, the asynchronous medium voltage output data signal being different than the medium voltage data signal,
based on the one or more low voltage output data signals, is supplied to the delay flip-flop data input,
wherein a medium voltage output clock signal derived from the medium voltage clock bus signal in a medium voltage portion of the slave device is supplied to the delay flip-flop clock input, and
wherein the delay flip-flop data output provides a synchronous medium voltage output data signal; and transmitting a medium voltage data bus signal to the master device of the bus system using a data output stage, wherein the synchronous medium voltage output signal is supplied to the data output stage.

13. The slave device according to claim 1, wherein the delay flip-flop data output provides the synchronous medium voltage output data signal to synchronize the asynchronous medium voltage output data signal with the medium voltage clock bus signal.

14. The method according to claim 12, wherein the delay flip-flop data output provides the synchronous medium voltage output data signal to synchronize the asynchronous medium voltage output data signal with the medium voltage clock bus signal.

* * * * *